(12) United States Patent
Chen

(10) Patent No.: US 6,507,881 B1
(45) Date of Patent: *Jan. 14, 2003

(54) METHOD AND SYSTEM FOR PROGRAMMING A PERIPHERAL FLASH MEMORY VIA AN IDE BUS

(75) Inventor: Joe Chen, Tainan Hsien (TW)

(73) Assignee: Mediatek Inc., Hsinchu (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/330,230

(22) Filed: Jun. 10, 1999

(51) Int. Cl.⁷ .......................... G06F 13/00; G06F 13/38
(52) U.S. Cl. ............................. 710/130; 710/5; 710/14; 710/129; 712/39; 712/43; 712/229; 713/100; 717/168; 717/173; 717/174; 717/178
(58) Field of Search .................... 709/100, 301; 707/203, 511; 710/1, 5, 8, 14, 15, 19, 20, 33, 34, 36, 52, 62, 74, 129, 130; 711/100, 102, 103, 104, 147, 152, 154, 163; 712/37, 38, 39, 43, 220, 225, 229; 713/100; 17/168, 169, 170, 173, 174, 175, 178

(56) References Cited

U.S. PATENT DOCUMENTS

| | | | | |
|---|---|---|---|---|
| 5,408,624 A | * | 4/1995 | Raasch et al. | 395/712 |
| 5,457,651 A | * | 10/1995 | Rouy | 365/185.04 |
| 5,459,850 A | * | 10/1995 | Clay et al. | 711/171 |
| 5,603,056 A | * | 2/1997 | Totani | 710/8 |
| 5,661,848 A | * | 8/1997 | Bonke et al. | 711/112 |
| 5,664,156 A | * | 9/1997 | Wang et al. | 395/500.44 |
| 5,675,761 A | * | 10/1997 | Paul et al. | 711/4 |
| 5,696,931 A | * | 12/1997 | Lum et al. | 711/113 |
| 5,701,450 A | * | 12/1997 | Duncan | 712/245 |
| 5,729,683 A | * | 3/1998 | Le et al. | 709/237 |
| 5,761,460 A | * | 6/1998 | Santos et al. | 710/129 |
| 5,784,390 A | * | 7/1998 | Masiewicz et al. | 714/763 |
| 5,805,882 A | * | 9/1998 | Cooper et al. | 713/2 |
| 5,920,884 A | * | 7/1999 | Jennings, III et al. | 711/102 |
| 5,968,141 A | * | 10/1999 | Tsai | 710/104 |
| 6,170,043 B1 | * | 1/2001 | Hu | 711/158 |
| 6,289,397 B1 | * | 9/2001 | Tsuyuguchi et al. | 710/1 |
| 6,304,925 B1 | * | 10/2001 | Liu et al. | 710/62 |
| 6,418,501 B1 | * | 7/2002 | Gama et al. | 710/305 |
| 6,434,034 B1 | * | 8/2002 | Wallace et al. | 365/52 |

OTHER PUBLICATIONS

Messmer, "The Indispensable PC Hardware Book: Your Hardware Questions Answered", second edition, 1995, pp. 780–783, 795–800, 1089–1090, 1130.*

* cited by examiner

Primary Examiner—Jeffrey Gaffin
Assistant Examiner—Tanh Nguyen

(57) ABSTRACT

A system for programming a periphery flash ROM is provided. The system in-cludes a host computer, an IDE interface, a flash controller, a flash ROM, and a microprocessor. The flash controller is coupled to the host computer through the IDE interface. The flash ROM and the microprocessor are also coupled to the flash controller. When the system enters a flash ROM programming mode, task files used between the IDE interface and the host computer are redefined by the host computer and is interpreted by the flash controller so that a firmware code from the host computer is written into the flash ROM through the flash controller. After the flash ROM is completely programmed, the task files return to their original definition. The microprocessor is required to disable the access to the flash ROM during the flash ROM programming mode. If several flash ROM programming cycles are needed in one host request, the firmware can be temporarily stored into a buffer, such as a RAM and then sequentially written into the flash ROM through the flash controller. Since the software method may occupy too much time of the IDE interface, resulting in a delay for the other subsequent activities, the hardware method may be a better way to update the firmware code, particularly to a large firmware code.

18 Claims, 2 Drawing Sheets

METHOD AND SYSTEM FOR PROGRAMMING A PERIPHERAL FLASH MEMORY VIA AN IDE BUS

BACKGROUND OF THE INVENTION

1. Field of the Invention

This invention relates to a computer control system, and more particularly to a method used in a system for programming a peripheral flash read-only memory (ROM) via an integrated device electronics (IDE) interface.

2. Description of Related Art

Recently, computer industry has been rapidly developed. Its various periphery hardware devices are also accordingly developed. As the computer system is continuously developing, in order to satisfy some new developed specifications or protocols or improve the compatibility with other devices, various related firmware codes are necessary to be updated. This results in that a lot of firmware data/code to control the periphery devices are necessary to be frequently read or updated. The firmware code generally is stored in a flash ROM. The computer system needs a method to be able to rapidly and conveniently program the flash ROM so as to update the firmware code/data.

Currently, several methods are used by a computer system to read the firmware code stored in the flash ROM. In a system disclosed by U.S. Pat. No. 5,603,056, a control program for controlling a hard disk drive (HDD) and a rewrite program for rewriting the control program are stored together in an electrically erasable programmable ROM (EEPROM). Upon entering the rewrite mode, a central processing unit (CPU) in the HDD saves the control program in the flash EEPROM into a random access memory (RAM). The CPU erases the flash EEPROM and restores the rewrite program of the RAM in to the flash EEPROM. The CPU receives a new control program from a host computer and loads it in the flash EEPROM. The erasing of the flash EEPROM and the loading of the new control program are performed by the CPU in accordance with the rewrite program saved in the RAM. In this conventional manner, a small computer system interface (SCSI) connector or an AT attachment (ATA) connector are used to serve as an input/output (I/O) interface and perform a serial communication with the host computer by using unassigned pins of the connectors. Since the used interface is not a general interface, this method cannot generally applied in various types of computer mother boards. Other methods are also disclosed by U.S. Pat. Nos. 5,408,624 and 5,729,683 but they are complicate and also depends on different system type.

Another conventional system using the IDE interface to update firmware code stored in a flash ROM is also proposed. Since the IDE interface is generally used in various periphery devices, the method can have loose restriction. A compact-disk (CD) read-only-memory (ROM), or called CDROM, is an essential periphery device of the computer. A peripheral device, such as a CDROM, is used for descriptions as shown in FIG. 1. In FIG. 1, the system includes a microprocessor 100, which serving as a controller is used to command all components, such as a servo 102 and a decoder 104 of a CDROM. The servo 102 is coupled to a CD 106 to read data stored in the CD 106. The firmware code including, for example, a control program and other information is stored in a flash ROM 108. The firmware code provides instructions for the microprocessor 100 to execute. The CDROM communicates with a host computer 110 through an IDE interface/bus. When the Firmware stored in Flash ROM needs to be updated. In the traditional method, the Flash ROM should be firstly disconnected from the peripheral, then is put into the programming equipment to be re-programmed. After the new Firmware has been successfully written into Flash ROM, it can be plugged into the peripheral again. Due to these complicate process, the traditional method is very inconvenient. Moreover, after products have been shipped to end-users, the traditional method is un-reasonable since most users have no programming equipment.

SUMMARY OF THE INVENTION

It is at least an objective of the present invention to provide a method for a computer system to program a flash ROM, which is usually used to store a firmware code, through redefining an ATA task files with respect to an IDE interface. The flash ROM can be directly programmed by a host computer without going through the programming equipment.

It is at least another objective of the present invention to provide a flash controller, which can directly communicate with a host computer through an IDE interface and directly program the flash ROM. The flash controller is independent to device hardware type.

In accordance with the foregoing and other objectives of the present invention, a method for programming a periphery flash ROM is provided. The method includes disabling other access to a flash ROM as a host computer requests to program or update a firmware code in the flash ROM. Several ATA task files in the host computer are redefined, in which the ATA task files usually are defined in ATA specification and are used as register-level communication interface between the host computer and an IDE periphery device. The firmware code from the host is transported through an IDE interface and then is written into the flash ROM through a programming control means, such as a flash controller. The flash controller interprets all IDE interface activities and issues a read/write flash ROM cycle. The flash controller provides a software method, a hardware method, or even a mixed method of software and hardware, to program the flash ROM. For the software method the firmware code is directly written into the flash ROM through the flash controller. For the hardware method, the method uses a buffer, such as a RAM, to store the firmware code if more than one flash ROM cycles are needed in one request. Then, the firmware code stored in the buffer is sequentially written into the flash ROM through the flash controller.

In accordance with the foregoing and other objectives of the present invention, a system for programming a periphery flash ROM is provided. The system includes a host computer, an IDE interface, a flash controller, a flash ROM, and a microprocessor. The flash controller is coupled to the host computer through the IDE interface. The flash ROM and the microprocessor are also coupled to the flash controller. When the system enters a flash ROM programming mode, task files used in the IDE interface are redefined Subsequently, all activities to read/write task files by the host computer will be interpreted with new definitions by the flash controller so that a firmware code from the host computer is written into the flash ROM through the flash controller. After the flash ROM is completely programmed, the task files return to their original definition. The microprocessor will be disabled to access to the flash ROM during the flash ROM programming mode. If several flash ROM programming cycles are needed in one host request, the firmware can be temporarily stored into a buffer, such as a RAM and then sequentially written into the flash ROM through the flash controller. Since the software method may occupy too much time of the IDE interface, resulting in a delay for the other subsequent activities, the hardware method may be a better way to update the firmware code, particularly to a large firmware code.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENT

A firmware code, which is usually stored in a flash ROM and is used to control related periphery devices of a host computer, is often needed to be updated during development A conventional method to update the firmware is inconvenient and is also system-type dependent.

Since an integrated device electronics (IDE) interface is generally used in periphery devices to communicate with a host computer. The invention provides a system using a flash controller to re-interpret all IDE bus activities and issues a read/write flash ROM cycle to directly program the flash ROM.

Figure 2:
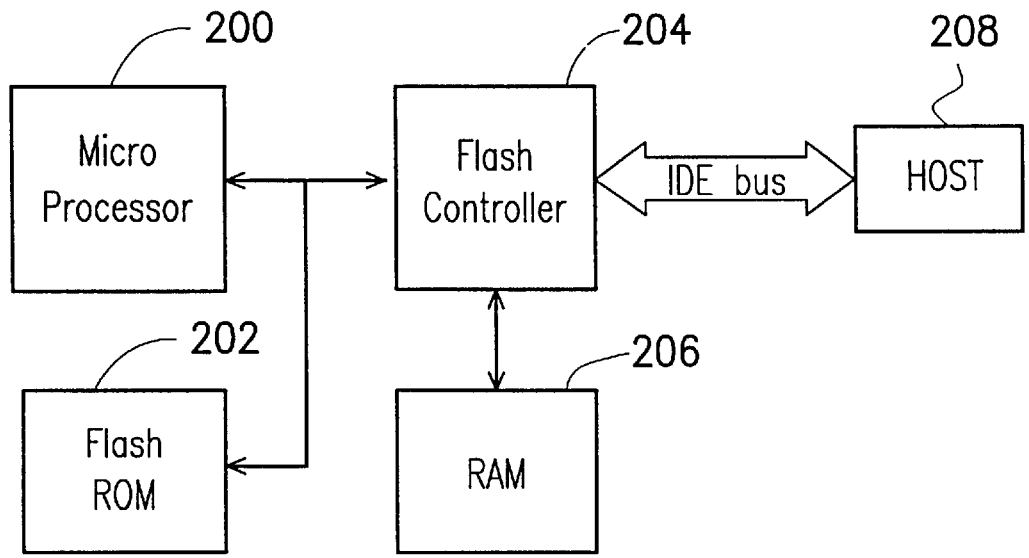
FIG. 2 is system block diagram, schematically illustrating a computer system used to program a flash ROM, which usually is used to store a firmware code to control a periphery device, according to a preferred embodiment of the invention.

FIG. 2 is system block diagram, schematically illustrating a computer system used to program a flash ROM, which usually is used to store a firmware code to control a periphery device, according to a preferred embodiment of the invention. A device system includes a microprocessor 200, a flash ROM 202, and a flash controller 204. The system can communicate with a host computer 208 through an IDE interface. The system can further include a RAM 206 to serve as a buffer. The flash controller 204 is coupled to the host computer 208 through the IDE interface. The flash ROM 202 and the microprocessor 200 are also coupled to the flash controller 204. The RAM 206 can be also coupled to the flash controller 204. As is to be described later in detail, the system can be operated in a software cycle and a hardware cycle. The RAM 206 is needed to serve a buffer as the system is operated in a hardware cycle, in which several flash ROM cycles are needed in one request to update the flash ROM 202.

Figure 1:
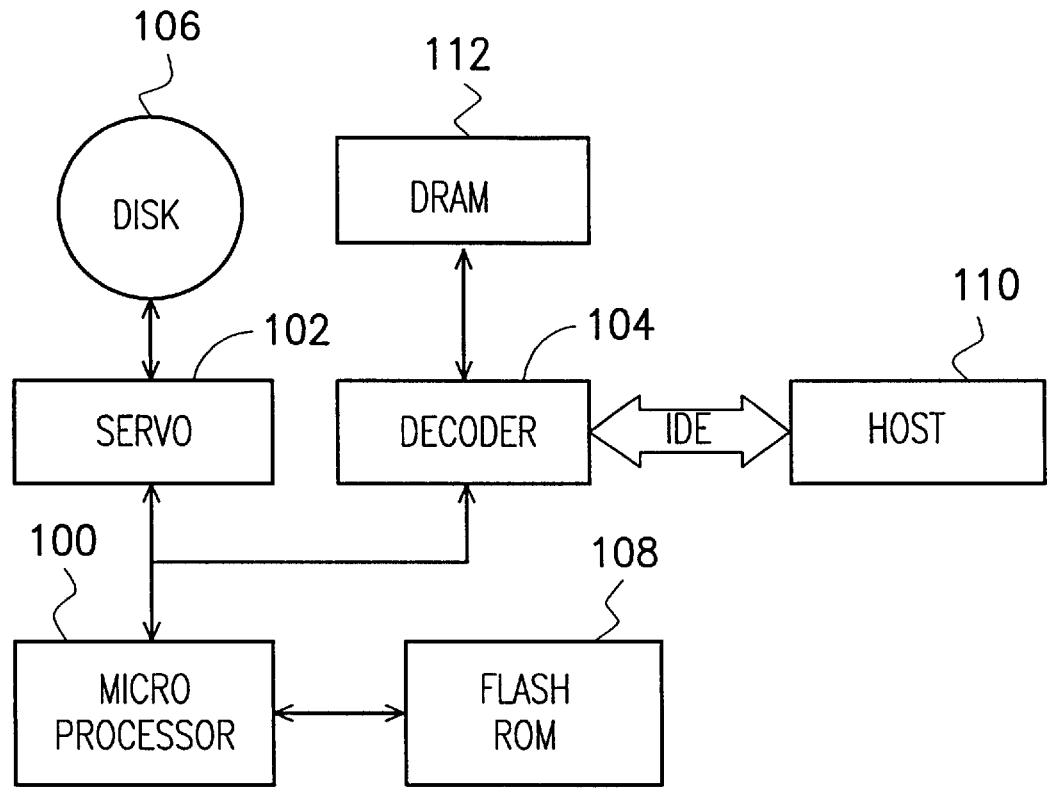
FIG. 1 is system block diagram, schematically illustrating a conventional computer system with a periphery CDROM, which is controlled by a firmware code stored in a flash ROM.

When the system enters a flash ROM programming mode, task files used in the IDE interface are redefined so that a firmware code from the host computer 208 is written into the flash ROM 202 through the flash controller 204. The task files, for example, are defined in ATA specification and are used as a register-level communication interface. The microprocessor 200 should stop access to the flash ROM 202 to avoid bus contention until the flash ROM 202 is completely programmed. Normally, after the flash ROM 202 is completely programmed, the flash controller 204 disables the flash ROM programming function and all IDE activities are treated back to their original definition to perform a normal mode operation for the periphery device coupled to the microprocessor 200 like the CDROM in FIG. 1.

In detail, whenever the host computer (Host) 208 makes a request to program the flash ROM 202, the Host 208 writes a vendor-specific IDE command to inform the device system. The flash controller 204 then transfers subsequent IDE activities to flash ROM cycles so as to perform programming. Upon the completion of programming, the Host 208 writes another vendor-specific IDE command to inform the system or just re-boot the system. Sequentially, the system returns to the normal mode.

All flash ROM cycles issued by the flash controller 204 can be divided into two types. One is called a software cycle and the other one is called a hardware cycle. Both of them provide read and write functions as well. In the software cycle, the Host 208 directly control the status of flash pins of the flash ROM 202 so as to generate proper waveforms used to read or write the flash ROM 202. The ATA task files have been re-defined to give the capability for the software cycle.

For example, four registers in ATA task files are re-defined as shown in table 1.

TABLE 1

| NAME | 7 | 6 | 5 | 4 | 3 | 2 | 1 | 0 |
|---|---|---|---|---|---|---|---|---|
| CTL | — | — | — | — | DRV | OE# | WR# | CS# |
| DBUS | DQ7 | DQ6 | DQ5 | DQ4 | DQ3 | DQ2 | DQ1 | DQ0 |
| ABUSLOW | A7 | A6 | A4 | A4 | A3 | A2 | A1 | A0 |
| ABUSHIGH | A15 | A14 | A13 | A12 | A11 | A10 | A9 | A8 |

All pins of the flash ROM 202, such as a 64K×8 flash ROM, can be mapped into the bits of these four registers, in which if other flash ROM with different size is used, extra pins are necessary to be mapped as well. For example, if a 128k×8 flash ROM is used, an extra pin A16 is needed to add into these four registers to provide the control-lability on it. In this manner, the Host 208 can write them to set or clear these pins and construct read or write cycle waveform arbitrarily. The status of the pins can be also obtained by the Host 208 by reading these registers. In Bit3 of CTL register, DRV is defined to allow the Host 208 to decide whether to drive a data bus or not. It is to avoid a bus contention since a flash ROM data bus usually is bi-directional and both of the flash controller and the flash ROM can drive the data bus.

Figure 3:
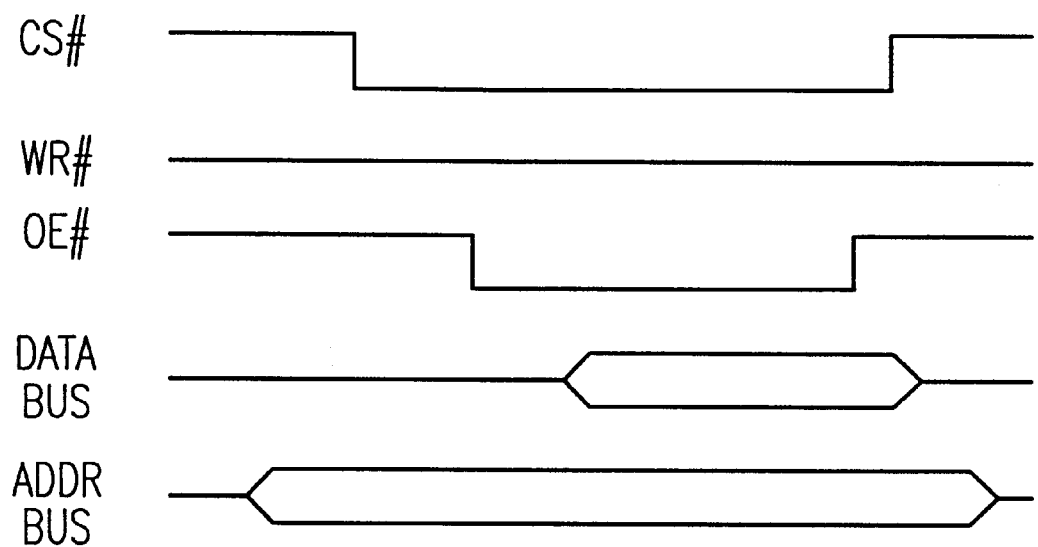
FIG 3 is a time sequence, schematically illustrating waveforms of several control bit signals in a task file to produce a software read cycle, according to the preferred embodiment of the invention.

The following sequence shows how the Host 208 to program those four registers to generate a software read cycle with the waveform shown in FIG. 3.

// assume all Flash related pins have been the inactive state,
// i.e., cs#=high, oe#high, wr#=high, and
// data pins are left floating,
write_ABUSLOW(????_????); // program desired read address
write_ABUSHIGH(????_????); // program desired read address
write_CTL (0000_0110); //clear cs#
write_CTL (0000_0010); //clear oe#
// wait for Flash ROM access time . . .
ReadBackData=read_DBUS;
write_CTL (0000_0110); //set oe# write_CTL (0000_0111); //set cs#

Figure 4:
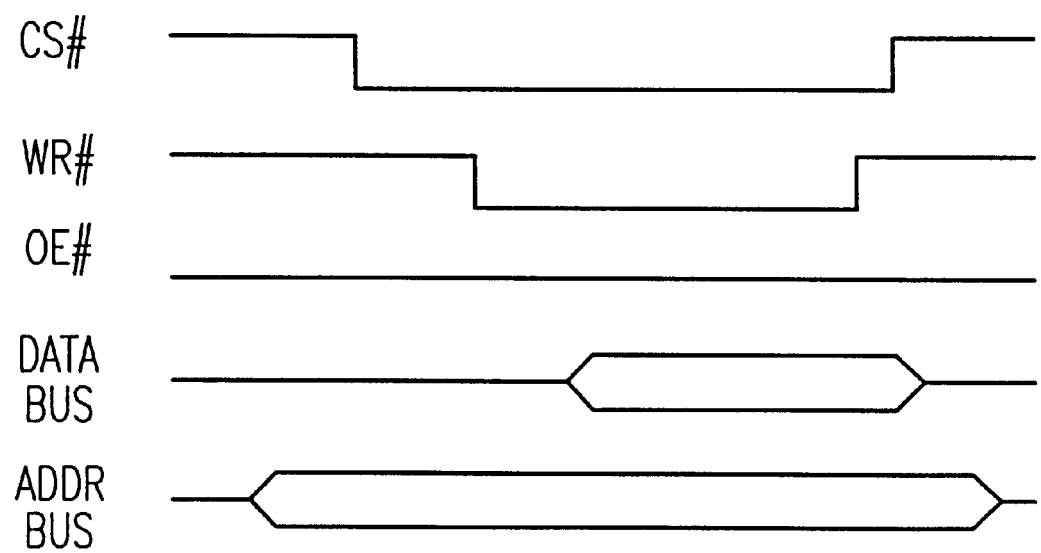
FIG. 4 is a time sequence, schematically illustrating waveforms of several control bit signals in a task file to produce a software write cycle, according to the preferred embodiment of the invention.

Similarly, the following sequence shows how the Host 208 to program those four registers to generate a software write cycle with the waveform shown in FIG. 4.

```
// assume all Flash pins have been the inactive state,
// i.e., cs#=high, oe#=high, wr#=high, and
// data pins are left floating,
write_ABUSLOW(????_????); //program desired write
    address
write_ABUSHIGH(????_????); //program desired write
    address
write_CTL (0000_0110); //clear cs#
write_CTL (0000_0100); //clear wr#
write_DBUS (????_????); //program desired write data
write_CTL (0000_1100); //set DRV and begin to drive
    data bus
write_CTL (0000_1110); // set wr#
write_CTL (0000_0110); //clear DRV and float data bus
write_CTL (0000_0111); //set cs#
```

Most Flash ROM's provide a command set to perform erase, chip identification, protect write, and so on. These commands are generally made up by reading/writing specific data to a specific address. Since the software cycles have more flexibility, they are useful for the Host 208 to issue the vendor-specific flash commands. The vendor-specific flash commands also includes a purpose to confirm the desired action so as to ensure the flash ROM 202 is exactly at the status for programming.

In the above descriptions, the flash ROM 202 is programmed through a software cycle. The RAM 206 in FIG. 2 is not necessary to be used. In the invention, the software cycle is only one of choices. Even though the method to program the flash ROM 202 through the software method has advantages of the invention, a hardware method is also introduced. When the software method of the intervention is used in the programming process to program the flash ROM 202, the IDE interface is occupied. If the firmware code has a large size to be updated, it may take long, resulting in a delay for the subsequent other IDE activities and a reduction of the system performance. A hardware method is introduced to further solve this problem. In the perspective of efficiency, hardware cycles may provide another better method when burst transfer is required.

In FIG. 2, for the hardware cycles, the firmware code are transferred to the flash ROM 202 by two steps. For example, in hardware write cycles, the first step is that the Host 208 first writes data, such as the firmware code, into the RAM 206 through the flash controller 204. The RAM 206 serves as a buffer. The flash controller 204 then transfers the buffered data in the RAM 206 into the flash ROM 202 in the second step. In Hardware read cycles, the first step is that the flash controller 204 reads data from the flash ROM 202 and stores them in the RAM 206, then the Host 208 can read data from the RAM 206 in the second step.

Two vendor-specific IDE commands are respectively defined for the hardware read cycle and the hardware write cycle. Moreover, three registers in the ATA task files are used as listed in table 2:

TABLE 2

| NAME | 7 | 6 | 5 | 4 | 3 | 2 | 1 | 0 |
|---|---|---|---|---|---|---|---|---|
| DATA | | | | DATA PORT | | | | |
| LENGTH | L7 | L6 | L5 | L4 | L3 | L2 | L1 | L0 |
| COMMAND/STATUS | BSY | — | — | — | DRQ | — | — | — |

When the Host 208 wants to initiate the hardware write cycle, it firstly write the command/status register to initiate an IDE hardware write command, which is one of the vendor-specific IDE commands. After receiving the command, the system sets the BSY bit and clears the DRQ bit, as shown in table 2, to indicate that it is at the busy state and no data transfer is requested. The system the is preparing for transferring data from the Host 208. At the meantime, the Host can process other tasks. As soon as it is ready, the BSY bit is cleared and the DRQ bit is set, then an IDE interrupt is issued to inform the Host 208. When the Host 208 polls the STATUS register, if the result is that the BSY bit is cleared and the DRQ bit is set, the Host 208 starts to write data into the DATA register and the data are stored into the RAM 206 through the flash controller 204. When the system receives data of bytes specified in LENGTH register, it clears the DRQ bit and sets the BSY bit again to inform the Host 208 to stop sending data. Then, the flash controller 204 automatically starts to issue subsequent write cycles and writes the data stored in the RAM 206 into the flash ROM 202. As the data transferring accomplishes, the device system clears the BSY bit and finishes the hardware write cycle. It must be noted that the Host 208 needs to give the initial value to the ADDRL (ABUSLOW) and ADDRH (ABUSHIGH) registers in the task file serving as a starting address before initiating the IDE hardware write command. The flash controller 204 is responsible to increase it after every successful data transferring.

Similarly, when the Host 208 wants to initiate the hardware read cycle, it firstly write the command/status register to initiate an IDE hardware read command which is one of the vendor-specific IDE commands. After receiving the command, the device system sets the BSY bit and clears the DRQ bit, then starts to issue read cycles to the flash ROM 202 and stores data from the flash ROM 202 into the RAM 206. The LENGTH register decides how many bytes of data are to be transferred. Upon the completion, the device system clears the BSY bit and sets the DRQ bit to request the Host 208 to read data on the RAM 206 through the DATA register. After the Host 208 reads all data, the device system clears the BSY bit and the DRQ bit. The hardware read cycle then is accomplished. It is noted that the Host 208 must give initial values to the ADDRL and ADDRH registers to serves as a starting address before issuing the IDE hardware read command. The flash controller 204 is responsible to increase it after every successful data transferring.

In summary, four vendor-specific IDE commands are added in the architecture of the invention and five registers in the ATA task files are re-defined when system enters Flash ROM programming mode. The new-added commands are listed as follows:

PROGRAMMING_FLASH_ON, used to switch the system to the flash ROM programming mode;

PROGRAMMING_FLASH_OFF, used to switch the system to the flash ROM programming mode;

HARDWARE_WRITE, used to trigger the write cycle; and

HARDWARE_READ, used to trigger the read cycle, where the last two are just for the hardware cycle. All ATA task files with their definition in flash ROM programming mode is described in the following table, in which the five registers LENGTH, CTL, DBUS, ABUSLOW, and ABUSHIGH are redefined.

TABLE 3

| NAME | DESCRIPTION |
| --- | --- |
| DATA | "Data Port". It is used as data port and have the same definition in ATA specification. |
| LENGTH | "Transfer Length". The register specifies the transfer byte count in Hardware cycles. |
| CTL | "Control" mapped to Flash ROM pins of cs#, wr#, and oe#. Host can use the register to control the status of the pins. |
| DBUS | "Data Bus" mapped to Flash ROM pins of data bus. Host can use the register to control the status of the pins. |
| ABUSLOW | "Address Bus Low" mapped to Flash ROM pins of address bus low byte. Host can use the register to control the status of the pins. |
| ABUSHIGH | "Address Bus High" mapped to Flash ROM pins of address bus high byte. Host can use the register to control the status of the pins. |
| DRIVE SELECT | "Drive Select". Host writes the register to select IDE devices. It has the same definition in ATA specification. |
| COMMAND/ STATUS | "Command/Status". Host writes the register to issue an ATA command and reads the register to obtain the device status. It has the same definition in ATA specification. |

In the manner of the invention, the flash ROM 202 can be directly programmed to update, for example, a firmware code through the IDE interface by simply redefining the registers of the ATA task files used by the IDE interface. There is no need to go through a route inside the periphery device. The programming process can be achieved by a software method or a hardware method, or even by a mixed method of those two. The software method includes one step that the host directly reads or writes the flash ROM through the redefined ATA task files.

The hardware method includes two steps that data transferred between the HOST and the flash ROM are first stored into a buffer, such as a RAM, and then the data on the RAM are written into the flash ROM for a write cycle, or are read by the Host. The IDE interface is released for other uses after data are temporarily stored into the RAM.

The invention has been described using an exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. A method for updating a firmware of a flash read-only memory (ROM), the method being suitable for a host computer (Host) to update the firmware of the flash ROM through an integrated device electronics (IDE) interface, the method comprising:

re-interpreting all IDE bus activities so that the flash ROM is updated without using definitions of the IDE interface;

redefining registers of task files from definitions of the IDE interface to definitions for updating the flash ROM;

entering a flash ROM programming mode by issuing an IDE control command from the Host, and the registers of the task files work under the definitions for updating the flash ROM;

reading or writing data on the flash ROM by the Host using the redefined task files of the IDE interface through a software cycle or a hardware cycle, in which the flash ROM has a plurality of pins;

leaving the flash ROM programming mode and returning to a normal mode with original definitions of the task files.

2. The method of claim 1, wherein the step of reading or writing data on the flash ROM further comprises assigning an initial address.

3. The method of claim 1, wherein in the step of reading or writing data on the flash ROM, the software cycle comprises directly accessing the pins of the flash ROM by the Host.

4. The method of claim 1, wherein in the step of reading or writing data on the flash ROM, the hardware cycle comprises temporarily storing the data into a memory buffer and then transferring the data from the memory buffer to the Host or the flash ROM depending on reading or writing, in which when the data are completely transferred through the IDE interface, the IDE interface is released for other uses.

5. The method of claim 1, wherein the registers of the task files are redefined, as follows:

a DATA register is used as a data port and has a same definition in the task files;

a LENGTH register is used as a transfer length to specify a transferring byte count of the data in the hardware cycle;

a CTL register is defined as a control mapped to the flash ROM pins of cs#, wr#, and oe#, in which the Host can use the CTL register to control or obtain a status of the pins;

a DBUS register is defined as a data bus mapped to the flash ROM pins of data bus, in which the Host can use the DBUS register to control or obtain a status of the pins; an accompanying bit is defined to decide the direction of data bus;

an ABUSLOW register is defined as an address bus low mapped to the flash ROM pins of an address bus low byte, in which the Host can use the ABUSLOW register to control or obtain a status of the pins;

an ABUSHIGH register is defined as an address bus high mapped to the flash ROM pins of an address bus high byte, in which the Host can use the ABUSHIGH register to control or obtain a status of the pins;

a DRIVE-SELECT register is defined as a drive select, in which the Host writes the DRIVE_SELECT register to select an IDE periphery device, and DRIVE_SELECT register has a same definition in the task files; and a COMMAND/STATUS register with a same definition in the task files, in which the Host writes the COMMAND/STATUS register to issue an AT attachment (ATA) command, and reads the COMMAND/STATUS register to obtain a programming status.

6. The method of claim 1, wherein the method comprises two commands in the redefined task files used to enter or leave the flash ROM programming mode, and two commands to start reading or writing the data on the flash ROM.

7. The method of claim 1, wherein the original definition of the task files used by the IDE interface is an AT attachment (ATA) specification.

8. The method of claim 1, wherein when the flash ROM is processed, other accesses to the flash ROM are temporarily inhibited.

9. A system for programming a flash read-only memory (ROM), the system communicating with a host computer (Host) through an integrated device electronics (IDE) interface, the system comprising:

a flash controller, which is coupled to the Host through the IDE interface and interprets task files used by the Host to write data into the flash ROM or read data from the flash ROM;

the flash ROM, coupled to the flash controller; and a microprocessor, coupled to the flash controller, wherein the microprocessor inhibits the access to the flash ROM while the flash ROM is in programming;

wherein when the flash ROM is to be updated, the Host redefines registers of the task files so that a plurality of control commands and the data are transferred between the system and the Host through the IDE interface, and so that original definitions of the IDE interface is changed and re-defined according to the re-defined registers of the task files;

when the Host requests to access the flash ROM, the Host switches the system into a flash ROM programming mode through a flash_on command of the control commands under the re-defined IDE interface and the re-defined registers of the task files, and leaves the flash ROM programming mode through a flash_off command of the control commands to return the original definitions of the IDE interface and the registers of the task files; and the flash controller receives read/write activities to the redefined task files from the Host and interprets these redefined activities to perform writing or reading the data on the flash ROM through a software cycle or a hardware cycle.

10. The system of claim 9, wherein when the system is operated in the software cycle, the Host can directly control flash ROM pins to transfer the data through the flash controller.

11. The system of claim 10, wherein when the system is operated in the software cycle, some registers of the task files are redefined as follows:

a CTL register is defined as a control mapped to the flash ROM pins of cs#, wr#, and oe#, in which the Host can use the CTL register to control a status of the pins;

a DBUS register is defined as a data bus mapped to the flash ROM pins of data bus, in which the Host can use the DBUS register to control a status of the pins;

an ABUSLOW register is defined as an address bus low mapped to the flash ROM pins of an address bus low byte, in which the Host can use the ABUSLOW register to control a status of the pins; and an ABUSHIGH register is defined as an address bus high mapped to the flash ROM pins of an address bus high byte, in which the Host can use the ABUSHIGH register to control a status of the pins.

12. The system of claim 9, wherein when the system is operated in the hardware cycle, the data are temporarily stored in a memory buffer, and then the flash controller transfers the data to either the Host or the flash ROM, depending on a desired purpose of writing or reading, in which as the data are completly transferred through the IDE inter-face, the IDE interface is released and returns to its original definition on the task files.

13. The system of claim 12, wherein the memory buffer comprises a random access memory (RAM) coupled to the flash ROM.

14. The system of claim 12, wherein when the system is operated in the hardware cycle, some registers of the task files are redefined as follows:

a DATA register is used as a data port and has a same definition in the task files;

a LENGTH register is used as a transfer length to specify a transferring byte count of the data in the hardware cycle; and a COMMAND/STATUS register with a same definition in the task files, in which the Host writes the COMMAND/STATUS register to issue an AT attachment (ATA) command, and reads the COMMAND/STATUS register to obtain a programming status.

15. The system of claim 9, wherein the software cycle and the hardware cycle can be independently used or in mixed use so as to achieve an in-system flash ROM programming.

16. The system of claim 9, wherein the flash ROM comprises a pin structure with 64K×8.

17. The system of claim 9, wherein the original definition of the task files used by the IDE interface is an AT attachment (ATA) specification.

18. The system of claim 9, wherein after redefinition, the task files comprises registers with definition as follows:

a DATA register is used as a data port and has a same definition in the task files;

a LENGTH register is used as a transfer length to specify a transferring byte count of the data in the hardware cycle;

a CTL register is defined as a control mapped to the flash ROM pins of cs#, wr#, and oe#, in which the Host can use the CTL register to control a status of the pins;

a DBUS register is defined as a data bus mapped to the flash ROM pins of data bus, in which the Host can use the DBUS register to control a status of the pins;

an ABUSLOW register is defined as an address bus low mapped to the flash ROM pins of an address bus low byte, in which the Host can use the ABUSLOW register to control a status of the pins;

an ABUSHIGH register is defined as an address bus high mapped to the flash ROM pins of an address bus high byte, in which the Host can use the ABUSHIGH register to control a status of the pins;

a DRIVE_SELECT register is defined as a drive select, in which the Host writes the DRIVE_SELECT register to select an IDE periphery device, and DRIVE_SELECT register has a same definition in the task files; and a COMMAND/STATUS register with a same definition in the task files, in which the Host writes the COMMAND/STATUS register to issue an AT attachment (ATA) command, and reads the COMMAND/STATUS register to obtain a programming status.

* * * * *